United States Patent [19]
Cates et al.

[11] 3,794,304
[45] Feb. 26, 1974

[54] PNEUMATIC WEIR WATER LEVEL CONTROL FOR COOLING TOWER HOT WATER DISTRIBUTION BASIN

[75] Inventors: Robert E. Cates, Leawood, Kans.; Robert M. Mitchell, Kansas City, Mo.

[73] Assignee: The Marley Company, Mission, Kans.

[22] Filed: June 19, 1972

[21] Appl. No.: 264,147

[52] U.S. Cl............ 261/111, 261/DIG. 11, 55/226, 251/61
[51] Int. Cl.............................................. B01f 3/04
[58] Field of Search 261/110, 111, DIG. 11; 55/226; 251/61–61.5

[56] References Cited
UNITED STATES PATENTS

| | | | |
|---|---|---|---|
| 3,322,409 | 5/1967 | Reed | 261/DIG. 11 |
| 3,635,042 | 1/1972 | Spangemacher | 261/DIG. 11 |
| 2,676,609 | 4/1954 | Pfurrer | 251/61 |
| 3,588,036 | 6/1971 | Harter | 251/61 |

Primary Examiner—Tim R. Miles
Assistant Examiner—Steven H. Markowitz
Attorney, Agent, or Firm—Schmidt, Johnson, Hovey & Williams

[57] ABSTRACT

A weir assembly has a rotatable weir member whose position for water level control or water diversion is governed by inflation or deflation of a collapsible wall, pneumatically operated tube supporting the weir member. The tube underlies the weir member in disposition such that charging and discharging of air from the tube to vary its cross-sectional size correspondingly raises and lowers the weir member. Segregation of the water flow in the hot water distribution basin of a water cooling tower may thereby be controlled to either vary the cooling capacity of the tower by changing the extent or pattern of water loading on an evaporative cooling structure below the distribution basin thereby affecting its cooling capacity or, in the case of a cooling tower having both wet and dry cooling sections served by a common air mover, to permit not only variation of respective water loadings but also the relative quantities of air permitted to pass through corresponding wet and dry sections. Use of the weir assembly adjacent one outer extremity of the distribution basin also permits effective prevention of ice formation on the inlet louvers associated with the evaporative cooling structure of the tower by the expedient of simply periodically raising the weir member of the assembly to a point where hot water from the distribution basin is caused to overflow the basin end wall and thereafter cascade down the louvers to the cold water collection basin.

12 Claims, 10 Drawing Figures

PATENTED FEB 26 1974

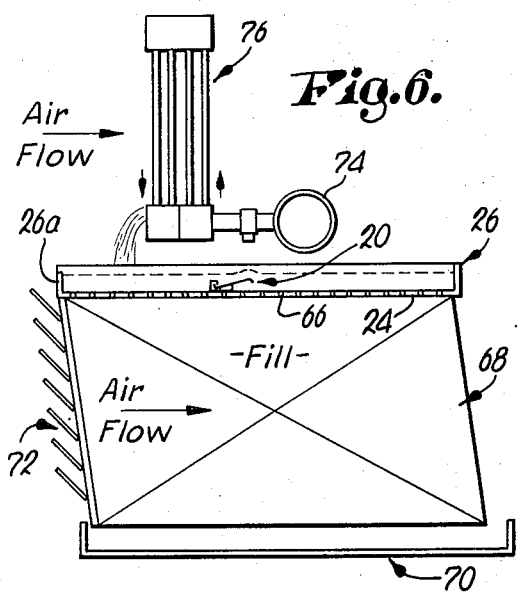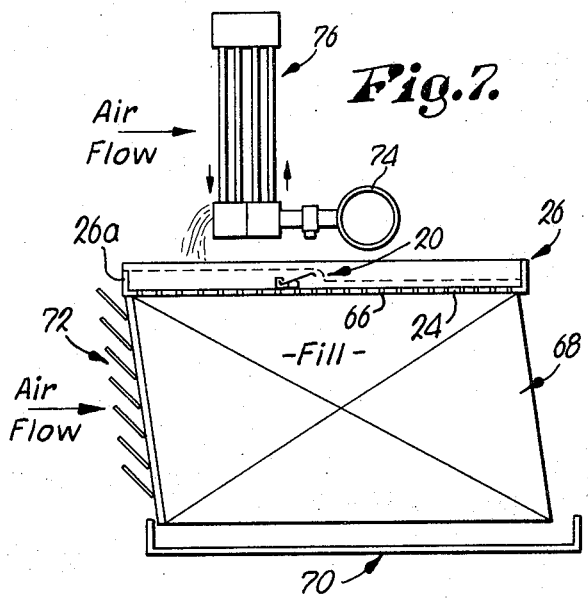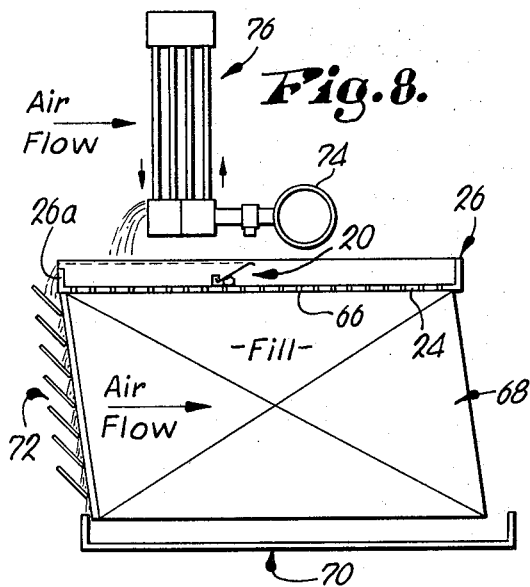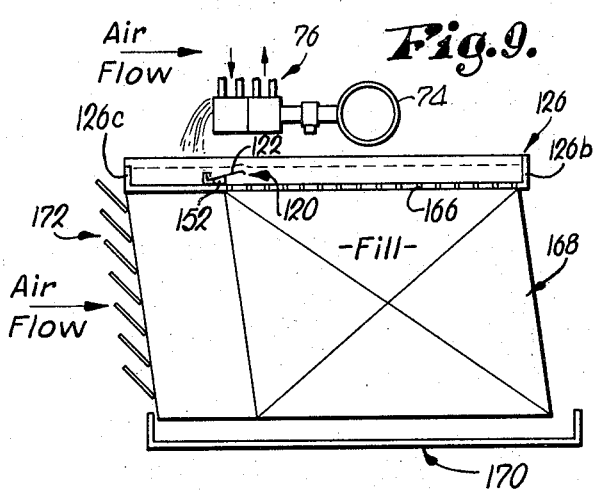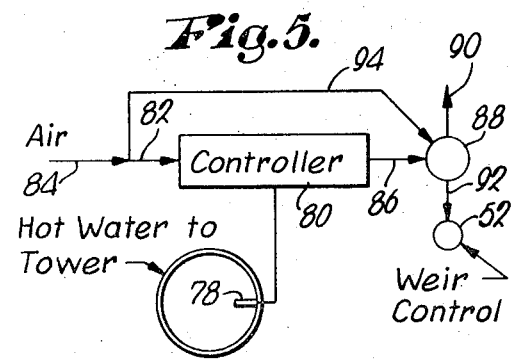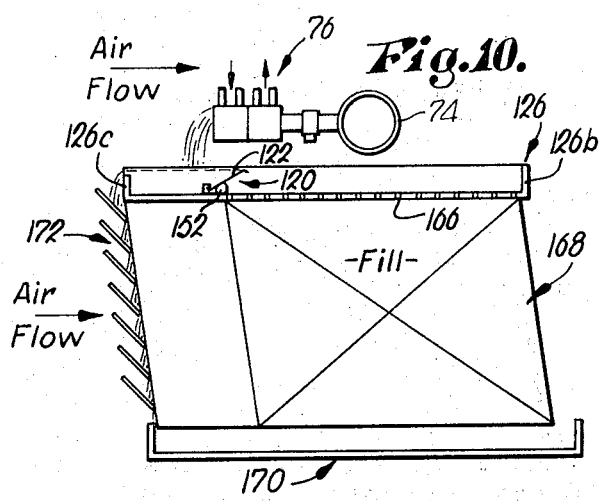

PNEUMATIC WEIR WATER LEVEL CONTROL FOR COOLING TOWER HOT WATER DISTRIBUTION BASIN

This invention relates to the field of water cooling towers and, more particularly, to means for controlling the depth or diversion of water collected in the hot water distribution basin of such towers.

In conventional evaporative type water cooling towers it is often necessary or desirable to vary the temperature of the resulting cooled water flow in accordance with seasonal variations in temperature as well as changes in the operating characteristics of the equipment to which the cooled water is circulated, such as the condenser of a power generating facility. In order to accomplish this result, a part of the hot water may be diverted from the cooling structure of the tower to an appropriate extent in order to reach the desired blended temperature level in the water which is returned to the point of use.

Although temperature control by diversion of hot water as necessary for control purposes is relatively straight forward in equipment requirements and operating parameters thereof, the problems become more complex in the case of cooling towers of the type using both indirect, dry heat exchange units and direct, wet heat exchange structure. This is true where the air flows through the wet and dry sections in parallel or in series relationship. In the parallel air flow type of installation heated water is directed successively through finned heat exchange tubes in which ambient air passing in heat exchange relationship with the exterior of such tubes indirectly lowers the temperature of the water flowing therethrough, and then through evaporative type heat exchange structure in which water is dispersed over a large area and allowed to gravitate in droplets over the structure for direct impingement of cooling ambient air thereon. The two parallel, essentially separate airflows passed through the dry heat exchange tubes and the wet evaporative type heat exchange structure respectively are subsequently drawn into the plenum chamber of the tower for mixture with one another to form an exhaust plume rising from the tower.

In both types of wet-dry water cooling towers, the ambient airflow past the dry heat exchange tubes does not, of course, pick up moisture as it is drawn into the plenum chamber of the tower; however, the ambient airflow through the wet, evaporative type heat exchange structure necessarily becomes heavily laden with moisture which is carried into the plenum chamber for subsequent emission in the exhaust plume. From a visible plume standpoint, particularly on a cold day, the dry airflow poses no particular problems. However, depending upon the temperature of the surrounding air at the tower installation, the moisture laden airstream may pose a problem, if the temperature of the surrounding air is low enough to cause the moisture in the stream to condense, thereby producing fog. Such creation of fog is undesirable from several standpoints including its nuisance effects as the fog settles on neighboring surfaces in the vicinity of the cooling tower.

The formation of fog in this manner can be controlled to a large extent by regulating the proportion of dry air in the plume from the dry heat exchange tubes relative to moist air in the plume mixture from the wet heat exchange structure. To this end, by correlating the amount of dry air necessary in the plume with the temperature of air surrounding the tower and appropriately sizing the dry tube heat exchangers and the wet heat exchange structure, a plume having the desired fog abatement qualities may be produced.

However, conventional means of controlling the temperature of the cooled water issuing from the tower have included simply bypassing a portion of the hot water around the tower to the extent necessary. Accordingly, the dry air drawn from the heat exchange tubes into the plenum chamber of the tower would not be heated to the extent which would be the case if the water were not bypassed, which thereby diminishes the fog abatement capabilities of the tower. Also, it is beneficial, for best hydraulic distribution, to maintain a maximum flow to the dry heat exchange sections. Without the presence of dry air from the heat exchange structure there is an increased tendency to produce fog.

Aside from the plume abatement problem, it is also desirable in a wet-dry cooling tower to be able to effectively control the relative efficiencies of the wet and dry sections by regulating the amount of air which passes through each of the sections or the disposition of the hot water relative to the cooling air streams.

Accordingly, one important object of the present invention is to provide improved water temperature control through the provision of an actuatable weir assembly which may be located in the hot water distribution basin of a water cooling tower for stratifying the water level in the basin in variable amounts whereby to correspondingly vary the water loading on cooling structure receiving the stratified flow from the distribution basin.

Another important object of the present invention is to provide improved water temperature control in parallel airflow path water cooling towers without diminishing the fog abatement capabilities of such tower by disposing an actuatable weir assembly of the aforesaid character in the hot water distribution basin of the tower downstream from the dry heat exchange tubes thereof and upstream from the wet, evaporative type heat exchange structure thereof so that water may be selectively bypassed to the extent necessary around the evaporative structure. In this manner warm, dry air from the dry heat exchange tubes is always available to the extent necessary in the plenum chamber of the tower to abate fog formation.

Also an important object of the present invention is to provide wet-dry cooling tower structure embodying an adjustable weir assembly as described which is operable to permit water from the dry cooling section to be diverted from the underlying fill assembly and caused to cascade down the air inlet face of the fill assembly in partial or substantially complete blocking relationship to airflow through the fill thereby providing selective variation of the cooling efficiencies of the wet and dry tower sections respectively.

An additional important object of the instant invention is to obtain improved control of ice formation on the louvered, ambient airflow inlets associated with evaporative heat exchange structure of a water cooling tower by providing an actuatable weir assembly adjacent one extremity of the hot water distribution basin of the tower above the louvered inlets so that the weir assembly may be used to selectively release an overflow of water from the basin to the louvered inlets as required to avoid or eliminate ice formation at the louvered inlets.

A further important object of this invention is the provision of an adjustable weir assembly for use in the hot water distribution basin of water cooling towers wherein a multipositionable weir member of the assembly is controlled by a collapsibly walled, hollow element which receives and discharges pressurized control fluid in an amount necessary to effect shifting of the member between its various positions.

Yet another important object of the present invention is to provide a weir assembly as set forth above wherein the weir member thereof is shiftable by its control element not only between various positions for stratifying the water level in the distribution basin, but also to a position or positions causing overflow of the water from the distribution basin to entirely bypass at least a certain proportion of the cooling structure which would otherwise receive water from the distribution basin.

In the drawings:

FIG. 5 is a schematic representation of a control system for the weir assembly;

Figure 4:
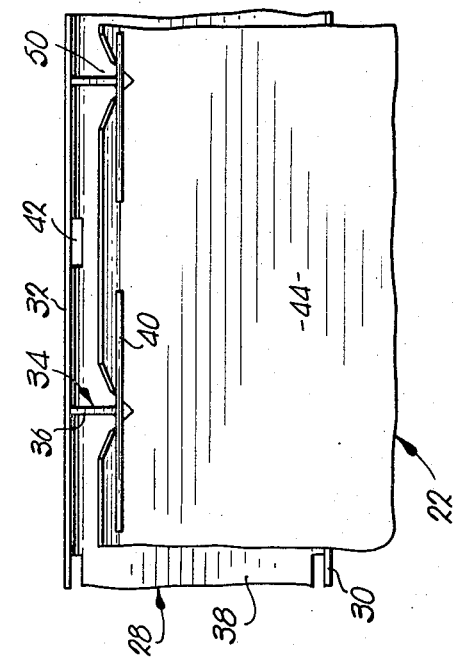
FIG. 4 is a fragmentary, top plan view of the assembly.

FIGS. 6, 7 and 8 are essentially schematic representations of a parallel airflow path cooling tower showing the weir assembly in successive positions of neutral, flow-stratifying, and full bypass; and FIGS. 9 and 10 are schematic representations similar to FIGS. 6–8 showing the weir assembly in use as a wet and dry cooling section efficiency regulating device or as an icing control means for the louvered ambient airflow inlets of the tower.

Referring initially to FIGS. 1–4, the weir assembly 20 includes an elongated weir member 22 formed of sheet material and supported for swingable inclination on the floor 24 of distribution basin 26 by a trough-like mounting support 28. Support 28 is cross-sectionally U-shaped with spaced-apart, upstanding, front and rear legs 30 and 32 respectively, the rear leg 32 having a plurality of longitudinally spaced-apart, T-shaped hinge units 34 affixed thereto. Each hinge unit 34 comprises an upstanding web 36, joined to leg 32 and the bottom 38 of support 28, and a crosshead 40 extending longitudinally of support 28 with its lowermost, longitudinal edge spaced above bottom 38. A series of longitudinally spaced drain openings 42 are provided in support 28 along the respective junctions of legs 30 and 32 with bottom 38.

Figure 1:
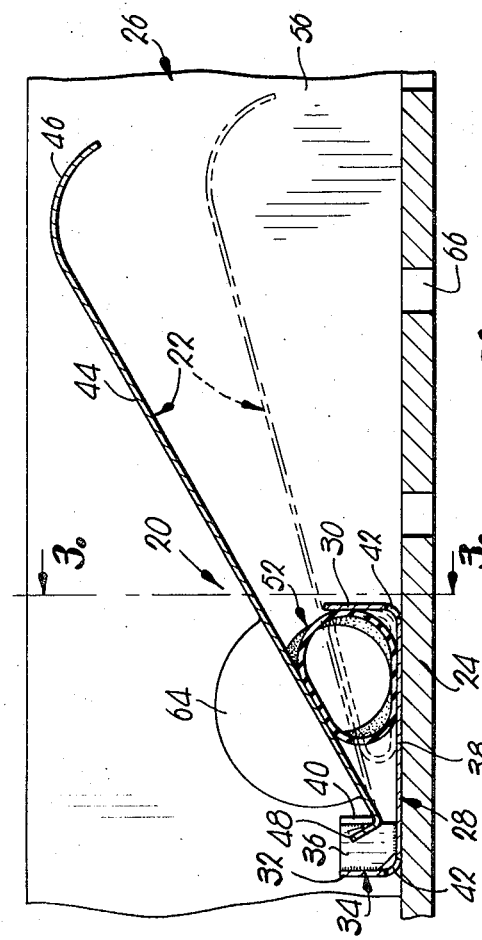
FIG. 1 is a fragmentary, vertical cross-sectional view of a weir assembly constructed in accordance with the present invention and installed in the hot water distribution basin of a water cooling tower, the maximum bypass position of the weir member of the assembly being indicated by solid lines and its neutral position being indicated by phantom lines.

Member 22 includes a main planar portion 44 for deflecting water flow and is provided at its outer end with a gently arcuate stiffening section 46. The inner end of member 22 has an upturned lip 48 projecting from planar portion 44 which is hooked beneath the lower edges of crossheads 40 to swingably mount member 22 for movement between the opposed positions thereof shown in FIG. 1. A series of V-shaped notches 50 in the lip 48 and planar portion 44 provide clearance for webs 36 of units 34 during such swinging or member 22. Also, as shown in FIG. 1, the front leg 30 of support 28 serves as a stop which is engageable with the lower face of planar portion 44 to limit swinging of member 22 in a downward direction within basin 26.

Figure 3:
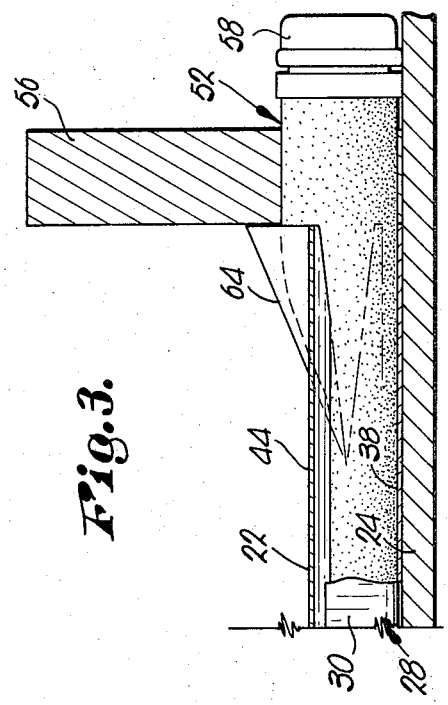
FIG. 3 is a fragmentary, cross-sectional view of the opposite end of the assembly with the weir member in its lowered, neutral position and taken along line 3—3 of FIG. 1.
Figure 2:
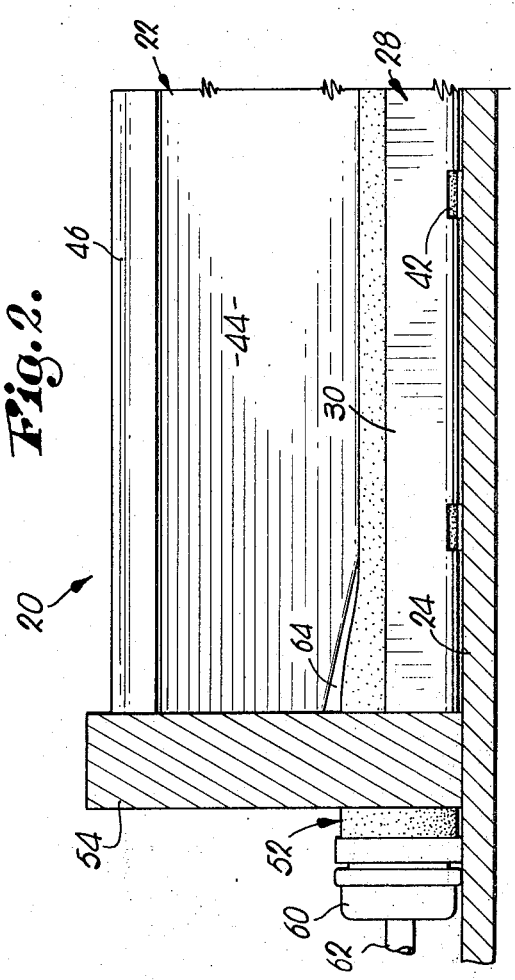
FIG. 2 is a fragmentary, front elevational view of the weir assembly at one end of the latter showing adjacent parts of the distribution basin in cross section for clarity.

Assembly 20 also includes means for controlling the swinging of member 22 between its inclined positions in the nature of a collapsibly walled, synthetic resin fiber reinforced control tube element 52 which is received by support 28 against the front leg 30 thereof and extends in underlying relationship to member 22 forwardly of the hinge units 34 of support 28. As shown best in FIGS. 2 and 3, the member 22 and its support 28 extend longitudinally between opposed, upright components of basin 26 which may, for example, be an outer wall 54 at one end of the assembly 20 as shown in FIG. 2, or a partition 56 at the opposite end of assembly 20 as shown in FIG. 3. In both cases, the member 22 and its support 28 terminate at the respective upright component, but the control tube 52 extends therethrough for projection beyond wall 54 and partition 56 respectively. At the partition end of tube 52 a cap 58 is provided, and at the wall end of tube 52 an inlet fitting 60 is provided for a line 62 supplying control fluid such as air to tube 52.

Tube 52 may be so constructed as to assume a cross-sectionally cylindrical configuration when in a pressurized condition so that tube 52 may fit snugly through suitable passages in wall 54 and partition 56. In this manner a sealing fit may be established so that water is not lost from basin 26 around tube 52. Moreover, to insure that member 22 does not deform tube 52 in the vicinity of wall 54 and partition 56, member 22 is provided with a pair of relieved portions at opposite longitudinal ends of member 22 which may be conical in configuration for complementally receiving corresponding sections of tube 52 without depressing the same during downward swinging of member 22.

FIGS. 6–8 illustrate on a large scale one contemplated utilization of assembly 20. A parallel, airflow path cooling tower is schematically and fragmentarily shown in these Figures having its hot water distribution basin 26 provided with outlet orifices 66 in floor 24, evaporative type, wet cooling structure 68 designated "fill" and disposed directly below basin 26, and a cold water collection basin 70 disposed in underlying relationship to structure 68 for receiving cooled water therefrom. The outer side of structure 68 is provided with louvered, ambient air inlets 72 which direct the ambient air across the fill structure 68 for subsequent entry into the plenum chamber of the tower located at the opposite side of structure 68.

Above basin 26 in upstream relationship thereto, is disposed a hot water inlet header 74 for supplying water to parallel sets of dry, heat exchange tubes 76. By way of example only, the tubes 76, shown in FIGS. 6–8, are of the double-pass type in which water from header 74 is initially directed upwardly through a pair of right-hand tubes 76 for indirect heat exchange with an ambient airstream flowing against the elevated pairs of tubes 76 toward the plenum chamber of the tower and then is directed downwardly through a second pair of the tubes 76 for further indirect heat exchange with the airflow and for subsequent discharge into basin 26.

Although not illustrated in detail in FIGS. 6–8, its is understood that the evaporative heat exchange structure 68, designated as "fill" is of conventional nature and may, for example, comprise a series of horizontally and vertically spaced, generally horizontally disposed slats carried by a suitable corrosion-resistant, supporting grid so that water gravitating from orifices 66 in basin 26 contacts the slats and is repetitively broken up principally into droplets, although certain proportions also form films of water over successive slats before the cooled water is finally received in collection basin 70. Although the fill construction thus described is conventional for a crossflow type of tower as illustrated in FIGS. 6–8, it is to be understood that other equivalent fill structures may be used with equal facility in the present invention without departing from the principles thereof.

In operation, the weir assembly 20 may be positioned as shown in FIGS. 6–8, within basin 26 for regulating the water flowing within basin 26 toward outlet orifices 66 thereof. By discharging a predetermined amount of air from tube 52 through line 62, the weir member 22 may be rested upon leg 30 of support 28 in its lowermost, neutral position indicated in FIGS. 1 and 6. In this position it may be seen that the tube 52 is substantially collapsed to allow member 22 to remain in its lowered position. Thus, water in basin 26 establishes a uniform head throughout so that equal water loading exists on the evaporative structure 68.

For a number of reasons it may be desirable to change the temperature of the water collecting in collection basin 70. This is accomplished by inflating tube 52 with a predetermined amount of pressurized air to expand tube 52 from its collapsed condition a sufficient extent to raise member 22 to a desired height. As shown in FIG. 7, such procedure results in a stratification of the water level in basin 26 such that the flow through outlet orifices 66 is at two different rates, resulting in uneven water loading on the evaporative structure 68. Thus, water gravitating into collection basin 70 is of two different temperatures corresponding to its stratification in basin 26 to thereby change the average temperature of the body of water collected in basin 70.

By inflating tube 52 to its fullest extent with pressurized air, the weir member 22 is raised to its uppermost bypass position shown in FIGS. 1 and 8, thereby causing water delivered to basin 26 on one side of member 22 to overflow an outer wall 26a and then cascade down the inlet louvers 72 of the tower for ultimate collection in basin 70 along the outside of structure 68. Water contained on the left side of assembly 20, viewing FIG. 8, still gravitates in part through a portion of the orifices 66 and hence through the fill structure 68 therebelow, but the portion of basin 26 to the right of assembly 20 is nearly dry so that very little water is delivered to the corresponding fill structures 68 below such portion. Accordingly, in this position, assembly 20 causes the maximum differential in water loading on fill structures 68 and results in the maximum reduction of the cooling efficiency of evaporative structure 68, not only because of bypass of the water around the fill but also because of blockage of airflow through the air inlet face of the fill. Bypass of water outboard of the fill assembly also serves as an effective anti-icing system for cold weather operation of the cooling tower.

The specific position of assembly 20 within basin 26 may be varied without impairing its principles of operation, but it is suggested, as shown in FIGS. 6–8, that assembly 20 may be positioned to the left of center of basin 26 so that a majority of orifices 66 are left dry when member 22 is in its full bypass position of FIG. 8.

The position of member 22 as controlled by tube 52 may be regulated manually or by means of an automatic control system, one specific example of which is shown in FIG. 5. Such system employs a thermally, hydraulically or pneumatically responsive sensor which may be located at a number of possible positions in the water flow stream such as, for example, upstream of the cooling apparatus as shown in FIG. 5, or downstream therefrom in the cooled water issuing from collection basin 70. Sensor 78 is operatively coupled with a pneumatically operated controller 80 which receives operating air from an input line 82 coupled with a supply line 84. An output line 86 from controller 80 communicates the latter with a diaphragm type relay 88 having a bleed line 90 and an output line 92 which may correspond to the input line 62 for control tube 52. One side of the diaphragm in relay 88 communicates with line 86 from controller 80, while the opposite side receives a supply of pressurized air from line 94 coupled with supply line 84. The side of the relay diaphragm receiving air from line 94 communicates with the control tube 52 through the line 92 so that, by varying the amount of operating air supplied to relay 88 to flex the diaphragm, a proportional amount of air is delivered to the tube 52.

The above described system is especially adapted for installations in which the controller 80 may be disposed at a relatively great distance from tube 52. Moreover, it is especially suited for those installations in which tube 52 is of great length. Thus, it is necessary and desirable to provide the relay 88 which governs the distribution of pressurized air from line 94 into tube 52. In those installations in which the distance between controller 80 and tube 52 is not so great and tube 52 is of relatively nominal length, the use of relay 88 and line 94 may be eliminated with controller 80 communicating directly with tube 52. It is to be appreciated that the controller 80 also may be either the electrically, hydraulically or pneumatically actuated type.

FIGS. 9 and 10 illustrate another way in which the weir assembly 120 may be used for controlling the efficiency of the wet and dry sections of a parallel path wet-dry cooling tower as well as to preclude significant icing of inlet louvers 172. In this arrangement, the distribution basin 126 of the cooling tower is provided with an inner hot water basin wall 126b for containing the water against escape, while the outer outboard basin wall 126c is lower than wall 126b. Assembly 120 is located adjacent outer basin wall 126c and as is apparent from the showing of FIGS. 9 and 10, the bottom wall of basin 126 is devoid of water delivery orifices in the area thereof between wall 126c and assembly 120. Similarly, the plan area of fill assembly 168 underlying basin 126 is substantially equal to the area of basin between inboard wall 126b and assembly 20 thus leaving a space free of fill between inlet louvers 172 and the air inlet face of fill 168. The actual extent of this fill free space has been somewhat exaggerated in the schematic showings of FIGS. 9 and 10 for clarity and it will be obvious to those skilled in this art that the actual extent of the fill free area may be varied as desired for a particular installation.

The mode of operation of weir assembly 120 in the tower illustrated in FIGS. 9 and 10 is similar to that previously described in that upon maximum inflation of the control tube 152, the water diverting member 122 confines water in the area between assembly 120 and outboard wall 126c (FIG. 10) so that such water is forced to overflow the top of wall 126c and thereby cascade down inlet louvers 172 to the collection basin 170. The fill 168 is thus maintained relatively free of hot water and the efficiency of the evaporative cooling section as compared to the dry cooling section, may be drastically reduced and in many instances rendered virtually ineffective. This is because of diversion of hot water away from the area of hot water basin 126 so that water cannot gravitate through the orifices 166 thereof, coupled with blockage of air through fill 168 by the vertical wall of water cascading down inlet louvers 172.

As previously explained, overflow of water onto the louvers 172 also may be used to effect de-icing thereof if required in cold weather operation, with the weir member 122 being returned to its normally lower position when the louvers have been fully de-iced.

In the deflated condition of control tube 152, member 122 pivots downwardly to a point where hot water may fully cover the bottom wall of basin 126 for gravitation through orifices 166 into the fill assembly 168 therebelow.

As with the installation of FIGS. 6–8, assembly 120 as embodied in the tower structure of FIGS. 9 and 10, may be manually operated or automatically controlled by a system as illustrated in FIG. 5.

We claim:

1. In a water cooling tower:
a hot water distribution basin for collecting heated water from a supply source and distributing the same for subsequent cooling thereof;
a cold water collection basin spaced from said distribution basin;
cooling structure between said basins for receiving hot water from said distribution basin, cooling the water, and directing the cooled water into said collection basin,
said distribution basin being provided with a floor having a plurality of outlets to said structure for maintaining a flow of the water in the distribution basin toward said outlets; and
an actuatable weir assembly mounted at floor level in said distribution basin and including a weir member projectable to a variable extent above said floor for selectively stratifying water flow to said outlets whereby to correspondingly vary water loading on said cooling structure receiving the stratified flow, said assembly including a collapsibly walled, hollow control element operably associated with said member for effecting said variable projection of the member above said floor in response to the charging and discharging of fluid into and out of said element.

2. In a water cooling tower as claimed in claim 1, wherein said element comprises a synthetic fiber reinforced tube.

3. In a water cooling tower as claimed in claim 1, wherein said distribution basin has an overflow leading to said collection basin for bypassing said structure, said assembly being selectively operable to divert water to said overflow.

4. In a water cooling tower as claimed in claim 1, wherein said assembly is positioned in said basin to divert flow from at least a majority of said outlets when the assembly is operated to bypass flow to said collection basin via said overflow.

5. In a water cooling tower as claimed in claim 1, wherein said member has an inner end, said assembly further including means supporting said member adjacent said inner end for swinging movement toward and away from said floor.

6. In a water cooling tower as claimed in claim 5, wherein said element is disposed in underlying relationship to said member.

7. In a water cooling tower as claimed in claim 5, wherein said member is swingable by said element to variable degrees of inclination relative to said floor.

8. In a water cooling tower:
a hot water distribution basin for collecting heated water from a supply source and distributing the same for subsequent cooling thereof;
a cold water collection basin spaced from said distribution basin;
fill assembly structure between said basins for receiving hot water from said distribution basin, cooling the water, and directing the cooled water into said collection basin;
a louvered ambient air inlet for said structure outboard of the latter for introducing ambient air to the structure,
said distribution basin having wall means at the extremities thereof proximal to the air inlet and air outlet faces of the fill assembly structure for containing water against escape from the distribution basin, in outboard wall means adjacent the louvered air inlet being lower than the inboard wall means; and
a weir assembly adjacent the outboard wall means of the basin and having a shiftable weir member for selectively controlling overflow of water over said outboard wall means in response to raising and lowering of the shiftable weir member,
said assembly including means hingedly mounting said member for swinging movement in the basin between a water retaining and a water releasing position, and a hollow, collapsibly walled control element underlying said member for effecting said swinging of the member between said positions in response to the charging and discharging of a control fluid into and out of said element.

9. In a water cooling tower as claimed in claim 8, wherein said assembly includes means hingedly mounting said member for swinging movement in the basin between a water retaining and a water releasing position, and a hollow, collapsibly walled control element underlying said member for effecting said swinging of the member between said positions in response to the charging and discharging of a control fluid into and out of said element.

10. A cooling tower as set forth in claim 6 wherein is provided a dry water cooling section arranged to receive at least a part of the hot water from said supply source prior to delivery thereof to said distribution basin, there being means for moving cooling air streams through said dry cooling section and the fill assembly respectively, said weir member being movable to dispositions to vary the cooling capacity of the dry cooling section and fill assembly respectively by changing the extent and pattern of water loading on the fill assembly and the relative amounts of cooling air permitted to pass through said dry cooling section and the fill assembly respectively.

11. A cooling tower as set forth in claim 8, wherein is provided a dry cooling section adjacent said distribution basin and arranged to receive at least a part of the hot water from said supply source prior to delivery thereof to said distribution basin, there being means for moving ambient cooling air streams along separate paths through said dry cooling section and the fill assembly and to then combine such streams prior to return thereof to the surrounding atmosphere, said weir member being movable to dispositions to vary the cooling capacity of the tower by changing the extent and pattern of water loading on the fill assembly and the relative amounts of cooling air permitted to pass through said dry cooling section and the fill assembly respectively.

12. A cooling tower as set forth in claim 11 wherein said member is movable to a location diverting substantially all of the water delivered to the hot water distribution basin from the dry cooling section, away from the fill assembly for cascade across the air inlet face of the fill assembly directly into the cold water collection basin.

* * * * *